UNITED STATES PATENT OFFICE.

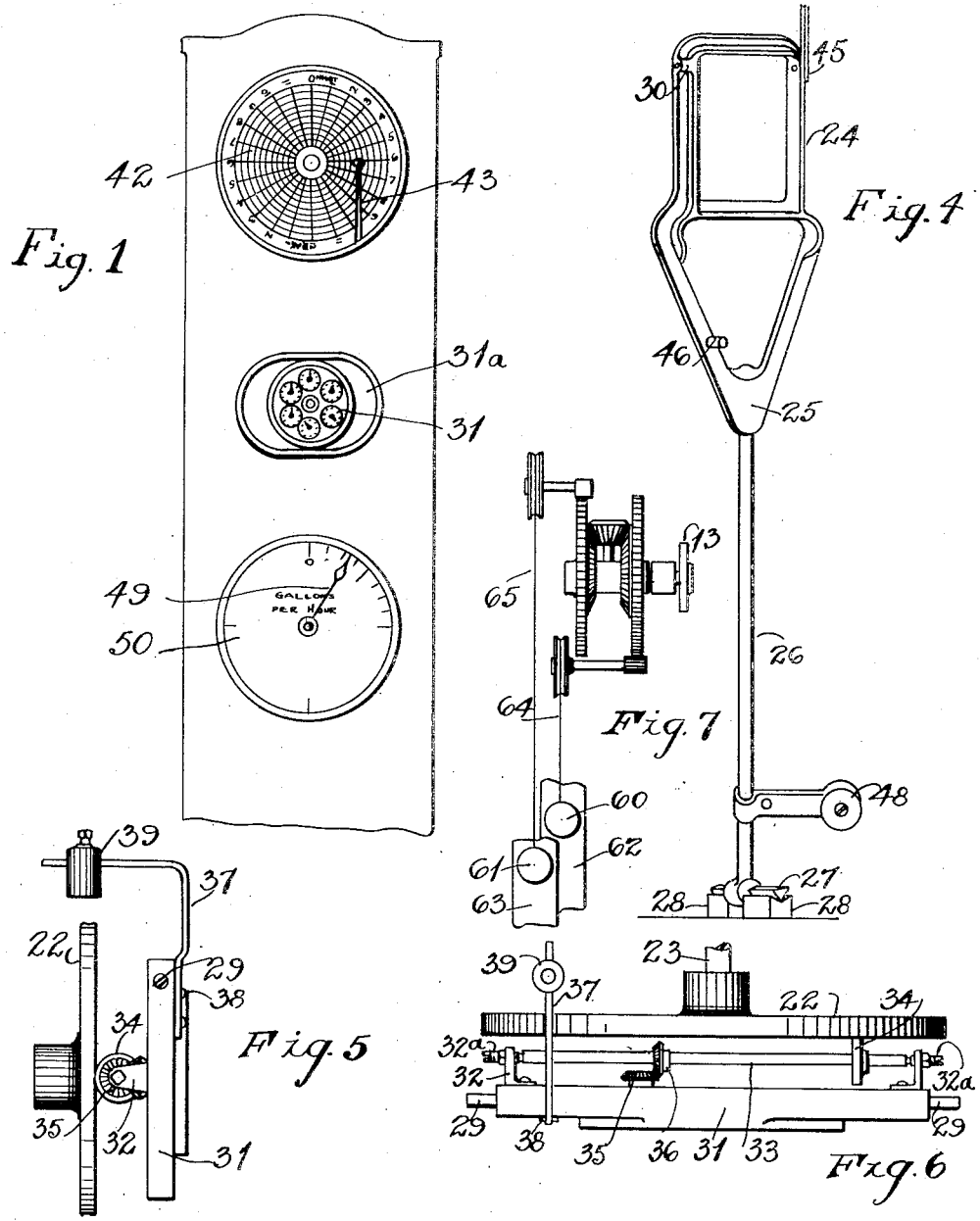

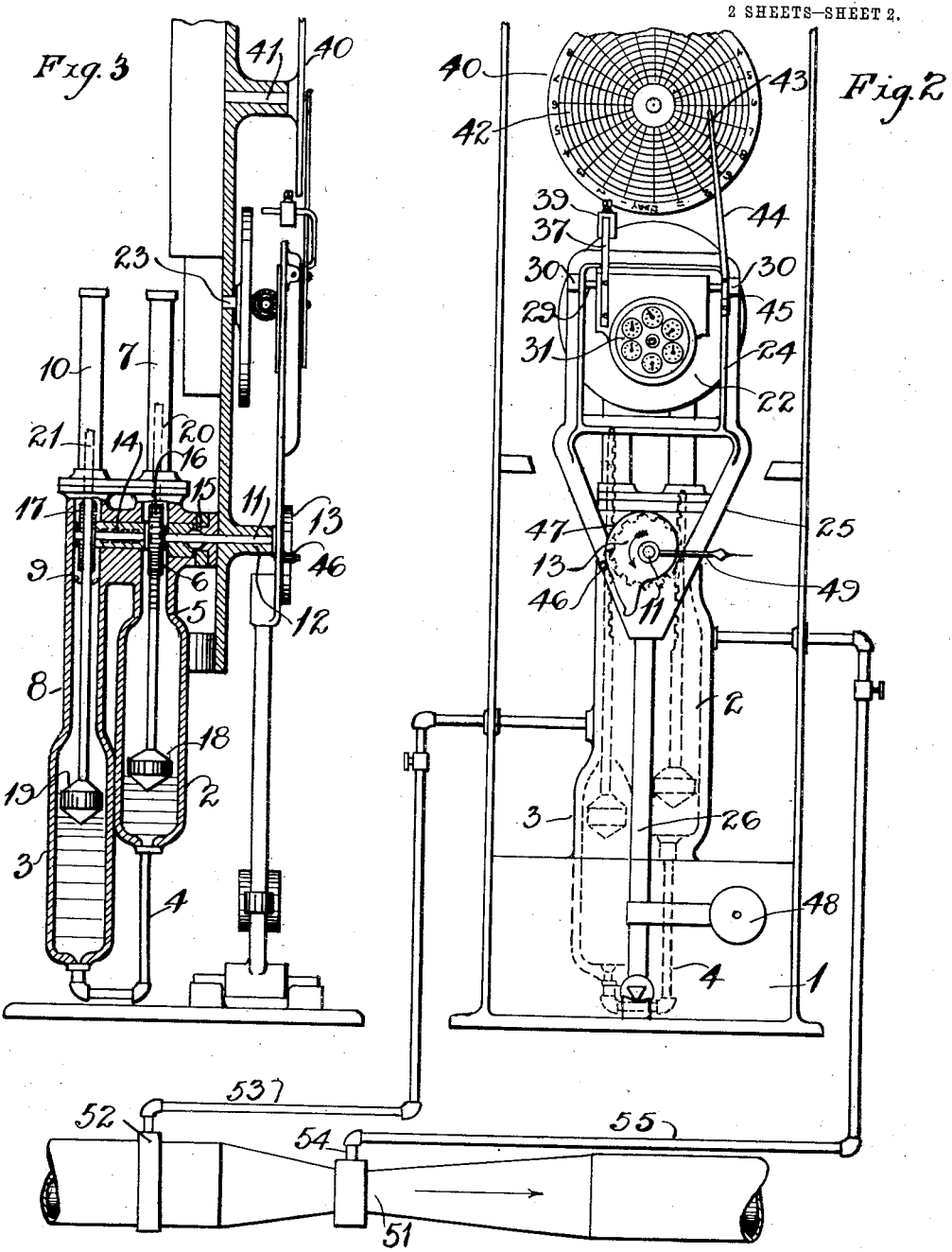

FREDERICK N. CONNET, OF PROVIDENCE, RHODE ISLAND.

INDICATING, INTEGRATING, AND RECORDING MANOMETER.

1,083,991. Specification of Letters Patent. Patented Jan. 13, 1914.

Application filed September 12, 1908. Serial No. 452,750.

*To all whom it may concern:*

Be it known that I, FREDERICK N. CONNET, a citizen of the United States, residing at the city of Providence, in the county of Providence and State of Rhode Island, have invented certain new and useful Improvements in Indicating, Integrating, and Recording Manometers, of which the following is a specification, reference being had thereto in the accompanying drawing.

This invention relates to a combined indicating, integrating and recording manometer, the same being adapted to automatically give the total in gallons, cubic feet or other convenient units of measure, of the quantity of liquids or gases passing through a given aperture and at the same time record the variation of the flow and also to indicate at all times the quantity passing through the pipe.

The object of my present invention is to provide simple and effective means whereby the friction of moving the integrating mechanism over the face of its driving disk may be reduced to a minimum so that an accurate reading from the integrator may be obtained. In carrying out my invention I have provided an oscillatory arm or frame in which the integrating mechanism is operatively mounted, the weight of said frame being supported and balanced on a knife edge, whereby the friction of carrying said frame and the integrator or counter back and forth over the face of the operating disk is reduced to a minimum.

Another feature of the invention is that the integrator is pivotally hung in said swinging frame and arranged to press the friction wheel against the face of the driving disk and automatically take up any wear or lost motion which may occur. Adjustable means are also provided for regulating the pressure of the friction wheel against the face of said disk.

My device is particularly adapted to register the flow through a pipe or tube of the class commonly known as a "Venturi tube," and said device may be actuated by any desirable mechanism, but for convenience I have shown two chambers connected to said tube one with the up-stream or high pressure side of the tube, and the second communicating with the throat or reduced portion of said tube. These chambers communicate with each other, and in each is a float supported on a column of mercury, said floats being connected through suitable mechanism to operate both the indicating and the integrating mechanism, and also to move a recording pen over the face of a continuously rotating record sheet.

The invention is fully set forth in this specification and more particularly pointed out in the appended claims.

In the accompanying drawings: Figure 1— is a front view of the manometer showing the face of the indicator, the face of the register, and the face of the recorder in the casing. Fig. 2— is a front elevation with the cover removed showing the interior mechanism by which the several devices are operated. Fig. 3— is a side elevation partly in section illustrating the operating mechanism. Fig. 4— is an enlarged view showing a detail of the oscillatory frame in which the register or counter is mounted. Fig. 5— is an enlarged side elevation illustrating the means for operating the register, also the adjustable weight for counterbalancing the same and regulating the pressure of the friction wheel on the driving disk. Fig. 6— is a top view showing the counter, the driving disk and the friction wheel mounted on a shaft and arranged to transmit its motion to said register through a pair of miter gears. Fig. 7— is a modification showing another arrangement whereby floats may actuate the cam through a set of differential gearing. Fig. 8— is an enlarged detail showing the bushing between the cylinders through which shaft 11 is adapted to pass.

Referring to the drawings, at 1 is the base or frame on which is supported a pair of cylinders 2 and 3, cylinder 2 being set somewhat higher than cylinder 3. At the lower end of each of these cylinders is a pipe 4 through which the two cylinders are connected together. The upper end of cylinder 2 is provided with a short neck 5 communicating with the circular opening 6 and a stand-pipe 7 extends upward from said opening in line with its neck 5, making the whole cylinder self-contained and watertight. The cylinder 3 is provided with a long neck 8 communicating with a circular chamber 9, corresponding to and in line horizontally with the circular chamber 6, and a stand-pipe 10 extends upward from the chamber 9 in line with its neck 8 making this cylinder also tight against a pressure of water.

At 11 is a horizontal shaft extending from the circular chamber 9 through the circular chamber 6 and out through the bearing 12, the actuating cam 13 being mounted on this end. This shaft is provided with a suitable bearing 14 between the two chambers and a stuffing box 15 as it extends from the circular chamber 6 out into the front casing. A gear 16 located in this chamber is mounted on and fixed to this shaft, and a similar gear 17 located in chamber 9 is also mounted on and fixed to this same shaft. At 18 and 19 are two floats adapted to rest on and be moved vertically by the change in the levels of the mercury in both of the cylinders.

To the upper end of float 18 is connected a long rack 20 adapted to engage one side of the gear 16, while to the float 19 is also connected a similar rack 21 adapted to engage the opposite side of the gear 17. When either of the floats is way up the rack extends into its stand-pipe and when the float is way down the bottom of the same rests upon the lower end of its cylinder.

At 22 is a disk or driver mounted on the shaft 23 to be rotated continuously by clock work or other convenient mechanism, not shown.

25 designates a frame the upper portion of which is preferably formed into substantially a rectangular shape, as at 24, and the lower portion in a triangular form, the whole being supported on the upper end of a long upright arm or rod 26, the lower end of said arm resting on a knife edge 27 in suitable bearings 28 so as to be free to swing and at the same time reduce the friction of carrying its load. A shaft 29 extends through the upper portion of this frame and is supported in bearings 30—30 on either side thereof, and on this shaft the counter or register 31 is loosely suspended. On the back of this counter are fixed the brackets 32—32 from which the horizontal shaft 33 is rotatably supported on the adjustable bearing screws 32ª, and to this shaft is fixed the friction wheel 34. The edge of this wheel is adapted to rest against the face of the driving disk 22 and drive the counter through the gears 35 and 36.

As the shaft 29 on which the counter is hung passes through the same at a point in the rear of its center of gravity, the lower portion of said counter has a tendency to hang backward or rearward out of a vertical line and carry the friction wheel 34 against the face of the driving disk 22. In order to regulate the pressure of this friction wheel against the face of said driving disk I have provided an arm 37 fixed to the face of the register at 38 and extending upward and rearward, and on this arm is mounted a weight 39 adapted to be adjusted along the same so as to counterbalance to some extent the rearwardly hanging tendency of said register and so regulate the pressure of the friction wheel against the face of the driving disk. The front face of the machine is cut away or slotted at 31ª to allow the counter to be visible as it is moved from one end of its stroke to the other. Above this counter is a record sheet disk 40 the same being mounted on a shaft 41 to be continuously rotated by clock works or other convenient mechanism, not shown. On this disk is mounted a record sheet 42, which may be ruled or arranged in any convenient manner. A recording pen or pencil 43 is supported on an upwardly extending arm 44, which latter is connected at 45 to one side of the frame 24, said pen being thus adapted to be moved over and to mark upon the face of the record sheet as said frame is oscillated or moved in the manner hereinafter described. In order to control the movement of this oscillatory frame a contact roll 46 is arranged to project from the face of said frame and is caused to rest against the edge 47 of the actuating cam 13 by means of the counterbalancing weight 48. The working edge of this cam is made in a shape necessary to control the movement of said frame in a given proportion to the amount of water passing through the tube, so that it will be properly positioned to cause a proper record to be made on the chart and also to properly actuate the register. In some cases it is also advisable to provide an indicator which will show at a glance the number of gallons per hour passing through the meter at the time of observation. In order to accomplish this result a hand 49 is mounted on the end of the shaft 11, which is caused to move over the face of a graduated disk 50, see Fig. 1, so that the position of the hand on the same will accurately indicate the number of gallons passing through at the time of the reading.

The operation of the device may be more fully described as follows: The liquids or gases flow through the tube 51 in the direction of the arrow. The up-stream side of the tube is connected at 52 by means of pipe 53 to the cylinder 3, while the throat is connected at 54 by the pipe 55 to the cylinder 2. When there is no flow through the tube the pressure at all points of the tube is, of course, the same and the floats in both cylinders are at the same height. As soon as the flow begins the pressure in the throat is decreased and becomes less than that at the point 52, therefore the mercury in chamber 3 is forced downward by the excess of pressure on this side, raising the mercury and float in the opposite chamber a corresponding amount. As these floats move one up and one down they act with corresponding force through their respective racks and gears on opposite sides of the shaft 11 to rotate the actuating cam 13 in proportion to their movement. When there is no flow through the tube the indicating hand 49 is at zero, the counter operating friction wheel 34 is at the center of the rotating driving disk 22 where it will not turn, and the marking pen 43 is at the zero point on its record sheet. As soon as the flow begins the floats change their relative levels rotating the cam in the direction of the arrow thereby allowing the frame to be moved to the right by means of the counterbalance weight 48, carrying the contact wheel from the center of the disk along the face of the same where it receives a rotary motion at a speed in proportion to its distance from the center of the plate. The greater the velocity of the water through the tube the greater the movement of the frame, and the faster the counter is driven, the indicating hand is also moved and the finger is carried a corresponding distance from the center of its disk. The integrating mechanism shows at a glance the total amount that has passed through the tube and the quantity, whether constant or varying, is clearly and accurately recorded on the record sheet for a predetermined period. These sheets when operated upon by the mechanism described should be removed and replaced by a fresh one every twenty-four hours. The integrating mechanism keeps on adding from day to day, and shows at all times the total amount used, while the indicating hand shows at once the amount that is passing through at the time of observation.

By the use of my improved construction the friction of moving the integrating mechanism is reduced to the minimum, thus rendering it possible for the device, owing to the lack of friction, to accurately indicate, register and record the amount of flow.

Fig. 7 illustrates a modification by which the cam 13 may be actuated, whereby the floats 60 and 61 are moved in their respective cylinders 62 and 63 by the difference in the pressures in the main pipe, said floats being arranged to operate said cam through the cords 64 and 65 and the differential gearing shown.

I do not restrict myself to the construction shown of using floats in cylinders for the purpose of operating the mechanism, as any suitable or convenient means may be employed for controlling the movement of the counter, the recording pen and the indicating hand in proportion to the velocity of flow through the pipe, without departing from the spirit and scope of my invention.

The long upright arm or rod 26, being supported upon a pivot below the substantial center of gravity of the said arm, constitutes in effect an inverted pendulum in that the entire weight of the said arm and whatever is carried thereby is supported at a single pivotal point that is well below the center of gravity thereof. This provides great delicacy of operation of the device because of the reduction of friction to the minimum. In other words, all parts of the apparatus that require to be shifted laterally by the operation of the cam 13 are, or may be, supported by this inverted pendulum which, owing to its delicacy of operation, presents the minimum of opposition to being oscillated by the cam 13. Consequently little or no opposition is presented to the cam being operated or adjusted by the variables employed in the apparatus.

Whatever device is employed for showing the differences of pressures, or the operations of the variables, whether such devices be a recorder or a register, or an indicator or integrating device, such showing device may properly be termed an "exhibitor". And in the embodiment of the invention illustrated herein, such exhibitor includes a laterally movable member which is supported by the inverted pendulum so that changes in the position of the cam will be exhibited.

Having thus described my invention, what I claim as new and desire to secure by Letters Patent, is:

1. In a fluid meter, a pipe provided with means for creating differential pressure by the flow therethrough at different points therein, an exhibitor for showing the amount of fluid flowing through said pipe, means for operating said exhibitor, a pivotally supported inverted pendulum by which said exhibitor is carried, and means actuated by said differential pressures for oscillating said pendulum to regulate the speed of operation of said exhibitor.

2. In a device of the character described a main pipe and means in the pipe for creating a difference of pressures, a cam, means interposed between the means in the pipe and cam whereby the difference of pressures operates the cam, an inverted pendulum arranged to be moved by the cam, and exhibiting mechanism controlled by the pendulum.

3. In a device of the character described, a main pipe and means in the pipe for creating a difference of pressures, a cam, means interposed between the means in the pipe and cam whereby the difference of pressures operates the cam, a vertical oscillating inverted pendulum mounted on a knife edge to be moved by the cam and exhibiting mechanism controlled by the cam.

4. In a liquid meter, a main pipe and means in the pipe for creating a difference of pressures, a cam and means between the cam and pipe whereby the difference in pressures operates the cam, an oscillating inverted pendulum arm whose position is determined by the cam, means for showing the amount of liquid which passes through the pipe and consisting of two parts, one part being carried by the oscillating pendulum arm and the other part being mounted independently of the said arm.

5. In a liquid meter, means in a pipe for creating a difference of pressures, a cam, and means for controlling its movements by the difference of pressures, an oscillating inverted pendulum moved by the cam, and mechanism controlled by the pendulum exhibiting the amount of liquid which passes through the pipe.

6. In a liquid meter, means in a pipe for creating a difference of pressures, a cam, and means for controlling its movements by the difference of pressures, an oscillating inverted pendulum moved by the cam, and mechanism part of which is controlled by the pendulum and part by an independent motive mechanism for exhibiting the amount of liquid which passes through the pipe.

7. In a device of the character described, a counter, an inverted pendulum carrying said counter, a main pipe, cam floats operatively connected to said cam, means whereby said floats are controlled in their movement by the differential pressures at two points in said pipe to actuate said cam to control the angular position of said pendulum, and means for variably actuating said counter according to the position of said pendulum.

8. In a device of the character described, the combination of a main supply pipe, a counter, a friction wheel carried by said counter, a rotatable driver for said wheel, a movable member mounted to carry said counter and wheel back and forth over the face of said driver, a cam, floats operatively connected to said cam, means whereby said floats are controlled in their movement by the differential pressures at two points in said pipe whereby the action of said cam is caused to control the movement of said movable member.

9. In a device of the character described, a counter, a rotatable driver for imparting variable speeds to said counter, an inverted pendulum carrying said counter, a main pipe, a cam, floats operatively connected to said cam, means whereby said floats are controlled in their movement by the differential pressures at two points in said pipe whereby the action of said cam is caused to control the movement of said pendulum.

10. In a device of the character described, a counter, a rotatable driving disk and a friction wheel for imparting variable speeds to said counter, oscillatory means for carrying said counter, and means whereby said counter is adapted to press said friction wheel against said driving disk by gravity.

11. In a device of the character described, a counter, a rotatable driving disk and a friction wheel for imparting variable speeds to said counter, oscillatory means for carrying said counter, and means whereby said counter is suspended to swing and press said friction wheel against said driving disk by gravity.

12. In a device of the character described, a counter, a rotatable driving disk and a friction wheel for imparting variable speeds to said counter, an oscillatory frame in which said counter is mounted, and a shaft in said frame from which said counter is suspended whereby the same is adapted to swing and automatically press said friction wheel against said disk.

13. In a device of the character described, a counter, a rotatable driving disk and a friction wheel for imparting variable speeds to said counter, oscillatory means for carrying said counter, means for supporting said counter whereby the same is adapted to press said friction wheel against its driving disk automatically, and means for regulating the pressure of said wheel on said disk.

14. In a device of the character described, a counter, a rotatable driving disk and a friction wheel for imparting variable speeds to said counter, an oscillatory frame in which said counter is suspended and is adapted to swing and automatically press said friction wheel against said disk, and means for regulating the pressure of said wheel on said disk.

In testimony whereof I affix my signature in presence of two witnesses.

FREDERICK N. CONNET.

Witnesses:
 HOWARD E. BARLOW,
 E. I. OGDEN.